United States Patent
Yamanashi

Patent Number: 6,108,136
Date of Patent: Aug. 22, 2000

[54] WIDE-ANGLE ZOOM LENS SYSTEM

[75] Inventor: Takanori Yamanashi, Hachioji, Japan

[73] Assignee: Olympus Optical Co., Ltd., Tokyo, Japan

[21] Appl. No.: 09/276,704

[22] Filed: Mar. 26, 1999

[30] Foreign Application Priority Data

Apr. 13, 1998 [JP] Japan .................................. 10-100798

[51] Int. Cl.[7] .................................................. G02B 15/14
[52] U.S. Cl. ......................... 359/682; 359/686; 359/680; 359/676
[58] Field of Search ................................. 359/682, 686, 359/680, 676

[56] References Cited

U.S. PATENT DOCUMENTS

| | | | |
|---|---|---|---|
| 4,172,635 | 10/1979 | Ogino ........................................ | 350/184 |
| 4,190,323 | 2/1980 | Ogawa et al. ............................ | 350/184 |
| 4,299,454 | 11/1981 | Betensky ................................. | 359/427 |
| 5,504,626 | 4/1996 | Oshikiri .................................... | 359/689 |
| 5,576,890 | 11/1996 | Tanaka et al. ........................... | 359/686 |
| 5,774,267 | 6/1998 | Kodama et al. ......................... | 359/557 |
| 5,982,429 | 11/1999 | Kamamoto et al. ..................... | 348/333 |

FOREIGN PATENT DOCUMENTS 53-43539  4/1978  Japan .

Primary Examiner—Georgia Epps
Assistant Examiner—Tim Thompson
Attorney, Agent, or Firm—Pillsbury Madison & Sutro, LLP

[57] ABSTRACT

The invention provides a wide-angle yet high-magnification zoom lens system which can have satisfactory performance with a simple lens arrangement, and an optical system which can make satisfactory correction for off-axis aberrations becoming a problem in taking wide-angle shots. The zoom lens system comprises a first lens group G1 having negative power, a second lens group G2, a third lens group G3 having positive power, a fourth lens group G4 having negative power and a fifth lens group G5. For zooming, the first group G1 moves nonlinearly and the second group G2 to the fifth group G5 moves toward an object side of the system on a wide-angle end basis. For a wide-angle end to a telephoto end of the system, the lens groups move such that spacings between the first group G2 and the second group G2, between the second group G2 and the third group G3 and between the fourth group G4 and the fifth group G5 become narrow while a spacing between the third group G3 and the fourth group G4 becomes wide. An aspherical surface is at least used in the first group G1. The zoom lens system satisfies a condition $0.7<|f_1/f_w|<3$ where $f_1$ is a focal length of the first group G1 and $f_w$ is a focal length of the zoom lens system at a wide-angle end of the system.

12 Claims, 10 Drawing Sheets

WIDE-ANGLE ZOOM LENS SYSTEM

BACKGROUND OF THE INVENTION

The present invention relates generally to a wide-angle zoom lens system, and more specifically to a wide-angle yet high-magnification zoom lens system which can have satisfactory performance with a simple lens arrangement.

Wide-angle zoom lenses so far available in the art are basically broken down into two types, one type being a negative power-preceding type two-group zoom lens having a negative-positive refracting power profile, as viewed in order from an object side thereof, and another type being a positive power-preceding type three-group zoom lens having a positive-negative-positive refracting power profile, as viewed in order from an object side thereof. There is also proposed an extension or modification of these two basic types, wherein lens groups are divided for the achievement of high magnifications and large aperture ratios.

The negative power-preceding type has a retrofocus type arrangement at the wide-angle end, and is characterized in that the back focus can be reasonably ensured. Since the first lens group has negative refracting power, on the one hand, the height of incidence of axial rays on the rear lens group tends to increase at the telephoto end in particular, making aberration correction difficult. Thus, the negative power-preceding type has a problem in conjunction with the achievement of high zoom ratios and large aperture ratios. This type is also characterized in that the rear lens group has zooming action, the first lens group makes a nonlinear movement, and the spacing between the lens groups becomes narrow at the telephoto side. JP-A 53-140047 shows a zoom lens having an angle of view of about 74° and a zoom ratio of 2 or more, constructed with two lens groups, positive and negative. This zoom lens is used together with a flare stop to restrict ray bundles. JP-A 53-43539 shows that a zoom ratio of about 3 is achievable with four lens groups, negative, positive, negative and positive. However, there is some limit to the zoom ratio achieved. This publication discloses a unique variation of dividing the first lens group for the purpose of obtaining large aperture ratios rather than high zoom ratios.

On the other hand, the positive power-preceding type uses a zooming mode where the movement of each lens group takes part in zooming action. Attempts have been made to achieve size reductions by increasing the refracting power of the second lens group and increasing the refracting power of the first lens group accordingly. To permit this type to have a high zoom ratio, the third lens group is often divided into subgroups, thereby making correction for field curvature. Nonetheless, an increase in the diameter of the front lens and complexity of the lens arrangement still unavoidably occur. JP-A 54-25747 discloses a wide-angle to quasi-telephoto zoom lens, and JP-A 55-62419 discloses a wide-angle yet high-magnification zoom lens reaching completion. These have become a paradigm of currently available zoom lenses. In view of lens arrangements, however, complexity problems remain unsolved.

SUMMARY OF THE INVENTION

In view of such prior art problems as mentioned above, an object of the present invention is to provide a wide-angle yet high-magnification zoom lens system which can have satisfactory performance with a simple lens arrangement. Another object of the present invention is to achieve an optical system which can make satisfactory correction for off-axis aberrations that become a problem in taking wide-angle shots.

According to the present invention, these objects are achieved by the provision of a wide-angle zoom lens system comprising, in order from an object side thereof, a first lens group having negative refracting power, a second lens group, a third lens group having positive refracting power, a fourth lens group having negative refracting power and a fifth lens group, in which for zooming said first lens group moves nonlinearly and said second lens group, said third lens group, said fourth lens group and said fifth lens group move toward said object side on a wide-angle end basis, characterized in that:

for zooming from a wide-angle end of said system to a telephoto end of said system, said lens groups move such that a spacing between said first lens group and said second lens group, a spacing between said second lens group and said third lens group, and a spacing between said fourth lens group and said fifth lens group become narrow while a spacing between said third lens group and said fourth lens group becomes wide, an aspherical surface is used in at least said first lens group, and said system satisfies at least one of the following conditions:

$$0.7<|f_1/f_W|<3 \quad (1)$$

$$0.3<|f_3/f_4|<1 \quad (2)$$

$$3<m_{345W}/m_{345T}<6 \quad (3)$$

where $f_1$ is a focal length of said first lens group, $f_W$ is a focal length of said system at said wide-angle end, $f_3$ is a focal length of said third lens group, $f_4$ is a focal length of said fourth lens group, $m_{345W}$ is a magnification of said third lens group to said fifth lens group at said wide-angle end, and $m_{345T}$ is a magnification of said third lens group to said fifth lens group at said telephoto end.

Why the above arrangement is used in the present invention will now be explained with reference its operation.

The present invention is intended for application to a wide-angle, yet high-magnification, zoom lens for single-lens reflex cameras or digital cameras. In particular, the present invention has the object of developing an optical system ensuring that by selecting the type of zoom lens and the arrangement of lenses, high performance can be obtained with a simple arrangement. So far, four-group zoom lenses of –+–+ construction in order from the object side thereof, which are an extension of two-group zoom lenses of –+ construction, have often been used for a negative power-preceding type of high-magnification zoom lenses. The wide-angle zoom ratio of these zoom lenses is considered to be practically limited to about 3. At a higher zoom ratio, the sharpness of images becomes insufficient because higher-order spherical aberrations are produced on the telephoto side and off-axis ray bundles cannot be controlled. Given such facts, it is important to prevent application of unreasonable loads on an optical system by correcting distortion likely to occur on the wide-angle side with an aspherical surface in the first lens group and to determine a proper aperture ratio for the purpose of achieving high magnification in view of the characteristics of lens type. Unless any proper value is determined for this, there will be obtained an image having much flare due to remnant aberrations containing higher-order spherical aberration.

That is, the present invention accomplishes the object of the invention by use of the following basic arrangement.

The present invention provides a zoom lens system comprising, in order from an object side thereof, a first lens group having negative refracting power, a second lens group, a third lens group having positive refracting power, a fourth lens group having negative refracting power and a fifth lens group, in which for zooming said first lens group moves nonlinearly and said second lens group, said third lens group, said fourth lens group and said fifth lens group move toward said object side on a wide-angle end basis, characterized in that:

for zooming from a wide-angle end of said system to a telephoto end of said system, said lens groups move such that a spacing between said first lens group and said second lens group, a spacing between said second lens group and said third lens group, and a spacing between said fourth lens group and said fifth lens group become narrow while a spacing between said third lens group and said fourth lens group becomes wide, an aspherical surface is used in at least said first lens group, and said system satisfies at least one of conditions (1) to (3).

In the zoom lens system of the present invention having such an arrangement, the first lens group makes a nonlinear movement so as to compensate for an image plane position while the third to fifth lens groups make such zooming movements as defined by condition (3). The second lens group acts to correct field curvature although its contribution to zooming is slight. In particular, the second lens group makes a great contribution to correction of some considerable coma flare often found in a negative power-preceding zoom lens system. Here each condition is explained. Condition (1) defines the refracting power of the first lens group. When the upper limit of 3 in condition (1) is exceeded, the amount of movement of the first lens group increases with an increase in the size of the lens system. Falling short of the lower limit of 0.7 is desirous for reducing the diameter of a front lens. However, this is not preferable because it is difficult to construct the first lens group with a reduced number of lenses and there is an increased sensitivity to production errors. Condition (2) defines the refracting powers of the third and fourth lens groups that are a zooming part. Exceeding the upper limit of 1.4 in condition (2) is not preferable for correction of aberrations because the divergent action of the fourth lens group becomes strong in view of the amount of movement of the fourth and third lens groups and aberration balance. Falling short of the lower limit of 0.3 is again not preferable because the refracting power of the third lens group tends to become large, resulting in under-correction of aberrations inclusive of spherical aberration. Basically, condition (3) defines the zoom ratio. When the upper limit of 6 in condition (3) is exceeded, not only is the amount of zooming movement increased, but also the amount of nonlinear movement of the first lens group is increased because the upper limit of 6 is a certain limit to the negative power-preceding type. In addition, the correction of aberrations becomes difficult. Falling short of the lower limit of 3 is not preferable because the achievement of a high zoom ratio becomes impossible.

Preferably, the range defined by condition (1) should be reduced in the order described below.

$$0.8<|f_1/f_W|<3 \quad (1-2)$$

$$0.9<|f_1/f_W|<3 \quad (1-3)$$

$$1.0<|f_1/f_W|<3 \quad (1-4)$$

$$1.0<|f_1/f_W|<2.9 \quad (1-5)$$

$$1.1<|f_1/f_W|<2.9 \quad (1-6)$$

$$1.2<|f_1/f_W|<2.9 \quad (1-7)$$

$$1.3<|f_1/f_W|<2.9 \quad (1-8)$$

$$1.3<|f_1/f_W|<2.8 \quad (1-9)$$

Again, the range defined by condition (2) should preferably be reduced in the order described below.

$$0.4<|f_3/f_4|<1 \quad (2-2)$$

$$0.5<|f_3/f_4|<1 \quad (2-3)$$

$$0.5<|f_3/f_4|<0.9 \quad (2-4)$$

Still again, the range defined by condition (3) should preferably be reduced in the order described below.

$$3<m_{345W}/m_{345T}<6 \quad (3-2)$$

$$3<m_{345W}/m_{345T}<5 \quad (3-3)$$

$$4<m_{345W}/m_{345T}<5 \quad (3-5)$$

In the wide-angle zoom lens system of the present invention, the required back focus can be ensured by use of a general negative-positive refracting power profile at the wide-angle end, as viewed from the object side of the system. This is common to all embodiments of the present invention. Accordingly, it is noted that the present invention is suitable for single-lens reflex cameras, and digital still cameras or video cameras having quartz filters, etc. built in them.

By simplifying the construction of the first lens group having negative refracting power, it is possible to make the size of the first lens group small. To enable wide-angle shots and obtain a high zoom ratio, however, it is required to achieve an optical system for the first lens group, which, though using a reduced number of lenses, can have good aberration correction capabilities. To correct distortion with a minimum number of lenses, for instance, with at least one positive lens and at least one negative lens as contemplated in the present invention, it is required to use an aspherical surface that acts independently in a wide-angle region of the system. To make full correction for off-axis aberrations occurring in the wide-angle region, the action of the aspherical surface should preferably be enhanced. To achieve the desired aberration correction capabilities, accordingly, the first lens group is constructed of a positive lens and a negative meniscus lens and an aspherical surface is used for a first surface of the positive lens, a first surface of the positive lens or the like.

The second lens group following the first lens group is constructed of a cemented lens consisting of a positive lens and a negative lens, and is characterized by having a relatively small refracting power. By using the cemented lens, it is possible to reduce the amount of aberration occurring at each single lens and so reduce aberration fluctuations during zooming as much as possible.

The third lens group is at least characterized by comprising a cemented lens consisting of a positive lens and a negative lens, and a single positive lens. This lens group, on which divergent ray bundles from the first and second lens groups impinge, takes a great role in correction of spherical aberration. Thus, the necessary number of lenses must be used in this lens group. The third lens group makes correction for over-corrected spherical aberration occurring primarily at the first lens group.

The fourth lens group is constructed of at least a cemented lens consisting of a positive lens and a negative lens. The fifth lens group is smaller in refracting power than the rest. The fifth lens group is a final lens group and helps to achieve the flatness of the image plane.

In the present invention, it is desired that the zoom lens system satisfy the following condition (4):

$$3<|f_5|/f_W<8 \quad (4)$$

where $f_5$ is a focal length of the fifth lens group and $f_W$ is a focal length of the system at a wide-angle end of the system.

Exceeding the upper limit of 8 in condition (4) is not preferable because the refracting power of the fifth lens group becomes small and so the refracting power profile becomes improper in view of aberration correction. Falling short of the lower limit of 3 is favorable for size reductions, but makes it more difficult to construct the zoom lens system with a reduced number of lenses.

In the present invention, it is also desired that the following condition (5) be satisfied:

$$2<|f_5/f_4|<9 \quad (5)$$

where $f_4$ is a focal length of the fourth lens group and $f_5$ is a focal length of the fifth lens group.

Condition (5) defines the refracting powers of the fourth and fifth lens groups. When the upper limit of 9 in this condition is exceeded, the refracting power of the fifth lens group becomes large and so becomes a problem, because the amount of movement of the fifth lens group must be increased or no proper refracting power is otherwise obtained in view of aberration correction. Falling short of the lower limit of 2 is contrary to an object of the present invention and so is not preferable because of an increase in the amount of movement of the fourth lens group. To avoid this, it is required to make the spacing between the fourth lens group and the third or fifth lens group wide or make the zoom ratio low.

The range defined by condition (4) should preferably be reduced in the order described below.

$$3<|f_5|/f_W<8 \quad (4\text{-}2)$$
$$3<|f_5|/f_W<7 \quad (4\text{-}3)$$
$$3<|f_5|/f_W<6 \quad (4\text{-}4)$$
$$4<|f_5|/f_W<6 \quad (4\text{-}5)$$

Preferably, the range defined by condition (5), too, should be reduced in the order described below.

$$2<|f_5/f_4|<8 \quad (5\text{-}2)$$
$$2<|f_5/f_4|<7 \quad (5\text{-}3)$$
$$2<|f_5/f_4|<6 \quad (5\text{-}4)$$
$$2<|f_5/f_4|<5 \quad (5\text{-}5)$$
$$3<|f_5/f_4|<5 \quad (5\text{-}6)$$

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The wide-angle zoom lens system of the present invention is now explained with reference to Examples 1 to 5.

Figure 1A:
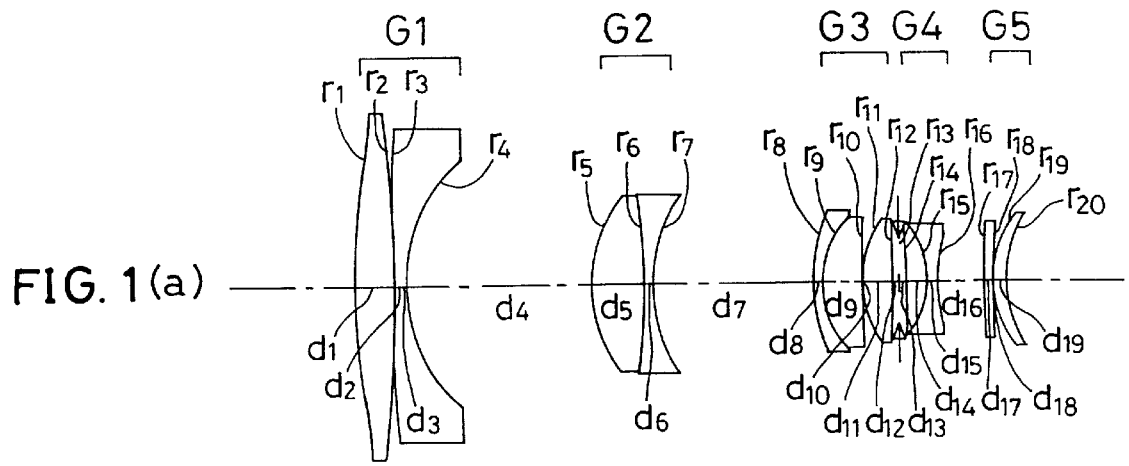
FIGS. 1(a), 1(b) and 1(c) are sectional schematics of Example 1 of the zoom lens system according to the present invention at a wide-angle end, an intermediate focal distance, and a telephoto end, respectively.
Figure 1B:
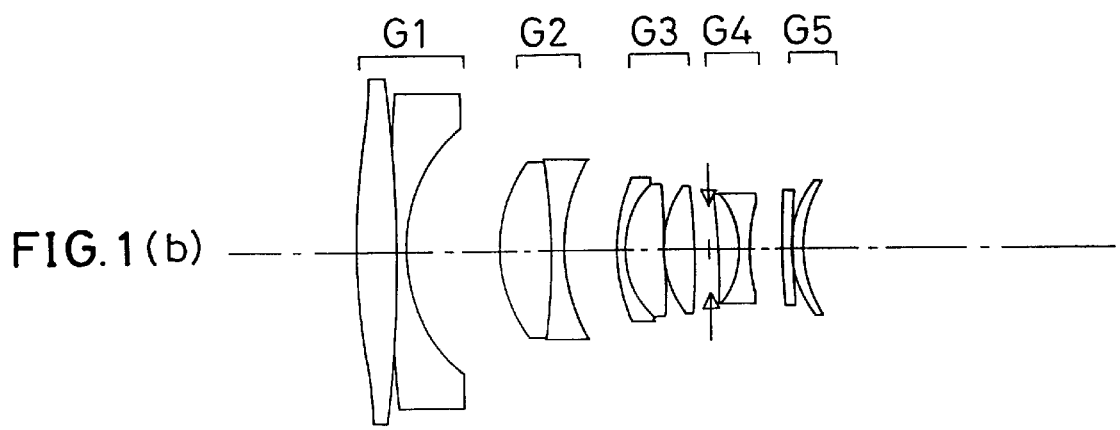
Figure 1C:
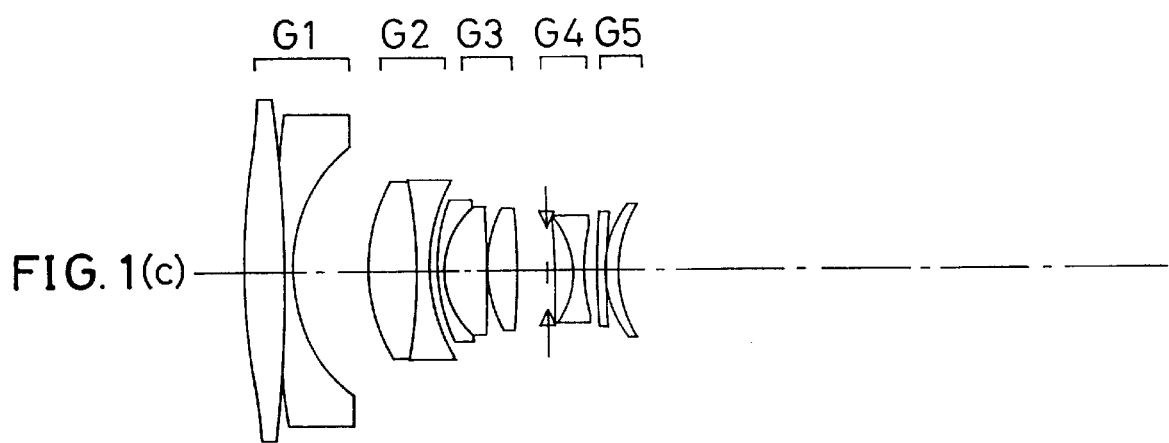
Figure 2A:
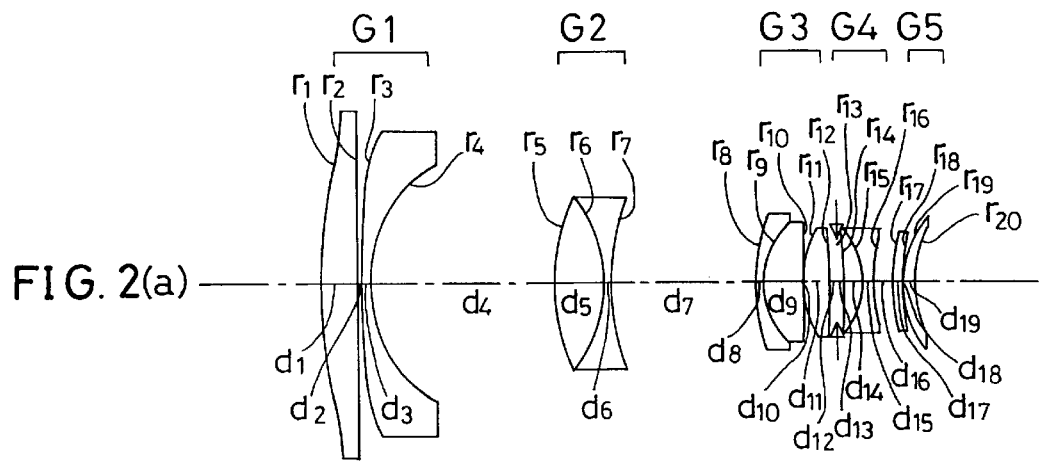
FIGS. 2(a), 2(b) and 2(c) are sectional schematics, similar to FIGS. 1(a), 1(b) and 1(c), of Example 3 of the present invention.
Figure 2B:
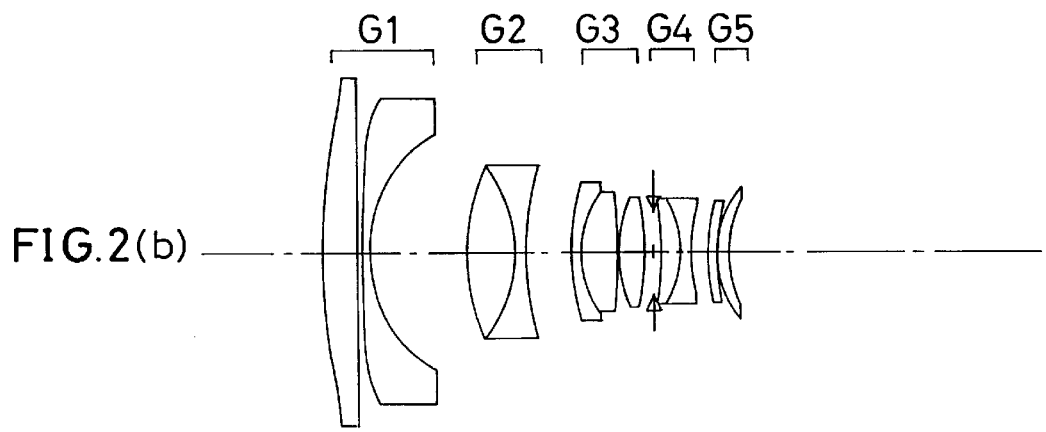
Figure 2C:
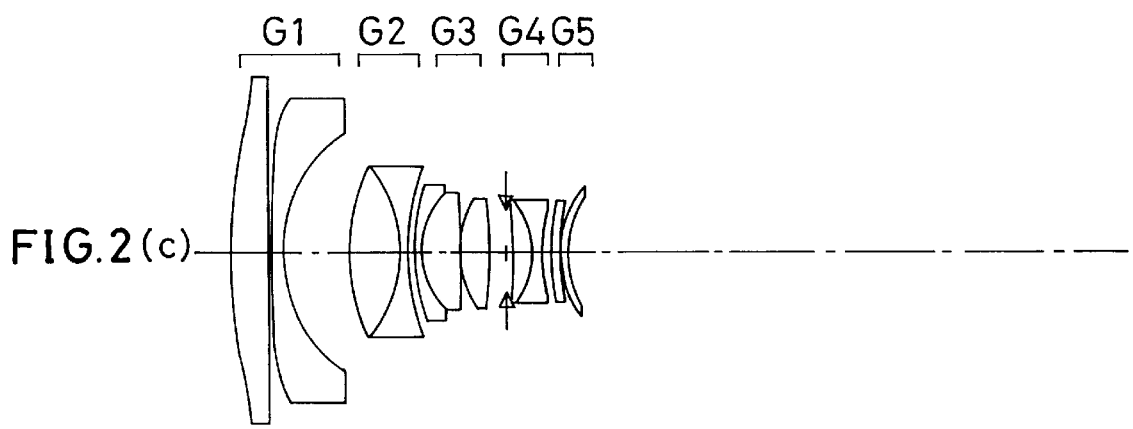
Figure 3A:
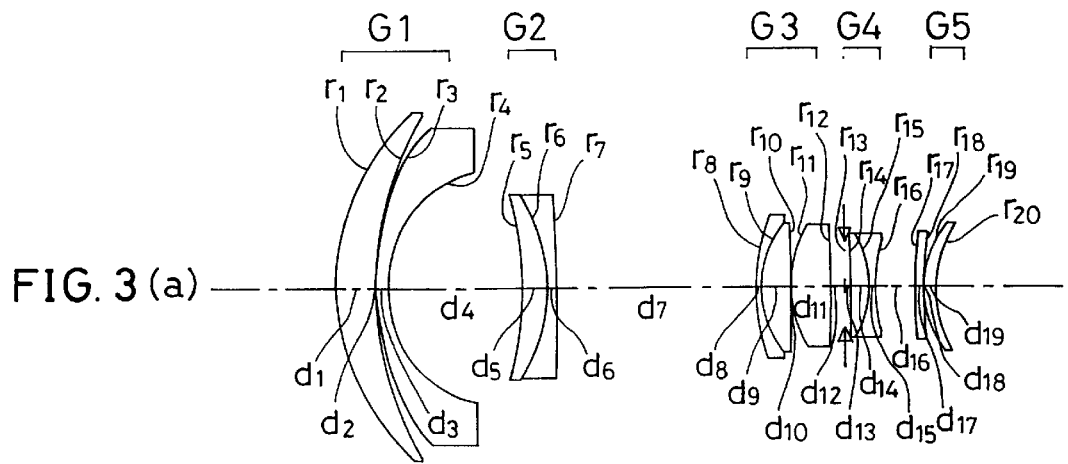
FIGS. 3(a), 3(b) and 3(c) are sectional schematics, similar to FIGS. 1(a), 1(b) and 1(c), of Example 5 of the present invention.
Figure 3B:
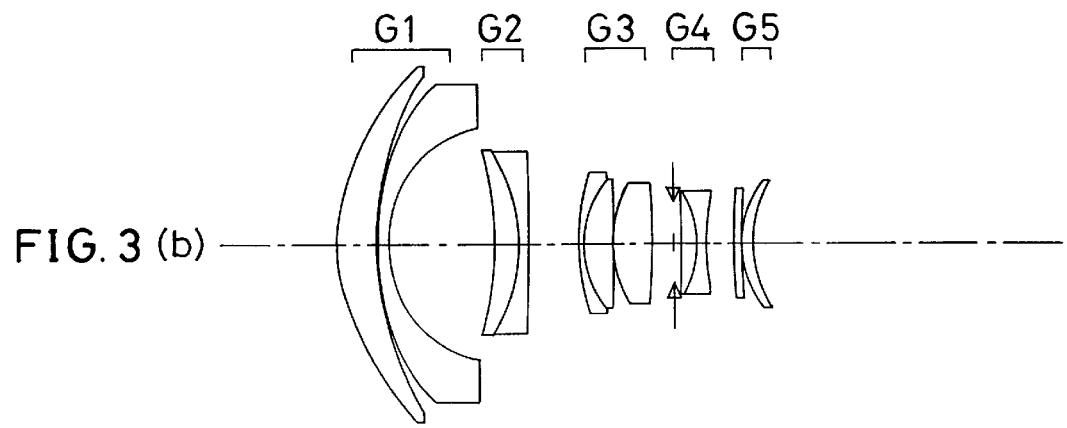
Figure 3C:
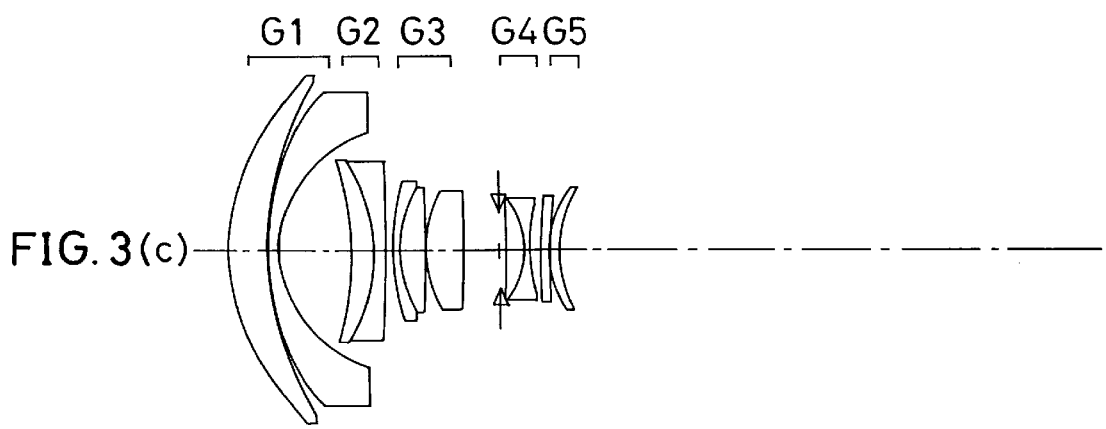

FIGS. 1, 2 and 3 illustrates lens section arrangements of Examples 1, 2 and 3 at a wide-angle end (a), an intermediate focal distance (b) and a telephoto end (c).

Example 1 is a zoom lens system having a focal length of 29.1 to 130.99 mm and an F-number of 4.16 to 7.62. As shown in FIG. 1, a lens arrangement for this zoom lens system is constructed of a first lens group G1 made up of a double-convex positive lens and a double-concave negative lens, a second lens group G2 made up of a doublet consisting of a double-convex positive lens and a double-concave negative lens, a third lens group G3 made up of a doublet consisting of a negative meniscus lens convex on an object side of the system and a positive meniscus lens convex on the object side and a double-convex positive lens, a stop, a fourth lens group G4 made up of a doublet consisting of a positive meniscus lens having a strong curvature on an image side of the system and a double-concave lens, and a fifth lens group G5 made up of two positive meniscus lenses convex on the object side, each having a relatively small refracting power. For zooming a wide-angle end of the system to a telephoto end of the system, the first lens group G1 moves slightly toward an image side of the system while it moves from the wide-angle end to an intermediate focal length, and moves toward the object side while it moves from the intermediate focal length to the telephoto side. The second to fifth lens groups G2, G3, G4 and G5 move such that from the wide-angle end to the telephoto end, a spacing between the first lens group G1 and the second lens group G2, a spacing between the second lens group G2 and the third lens group G3 and a spacing between the fourth lens group G4 and the fifth lens group G5 become narrow while a spacing between the third lens group G3 and the fourth lens group G4 becomes wide.

In the first lens group G1, two aspherical surfaces are used, one for an object-side surface of a first lens and another for an object-side surface of a second lens. An aspherical surface is used for an image-side surface of a lens located on an object side of the fifth lens group G5.

Figure 4A:
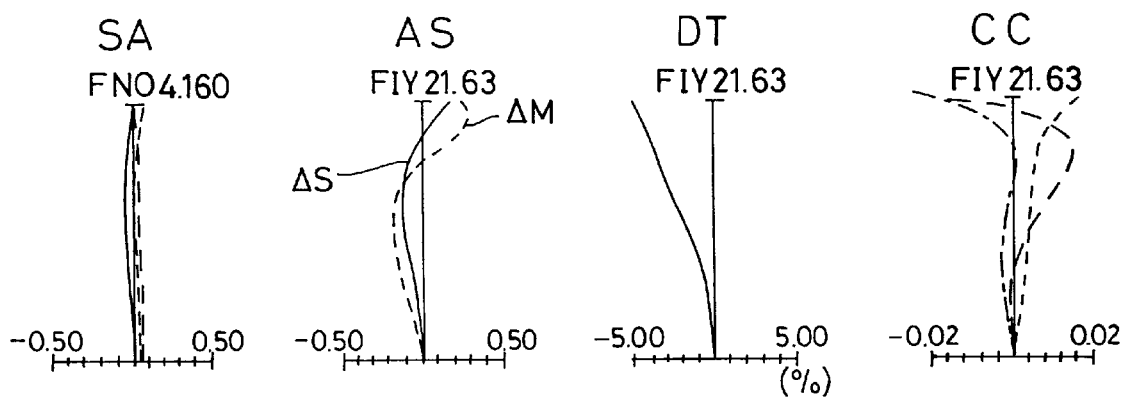
FIGS. 4(a), 4(b) and 4(c) are aberration diagrams for Example 1.
Figure 4B:
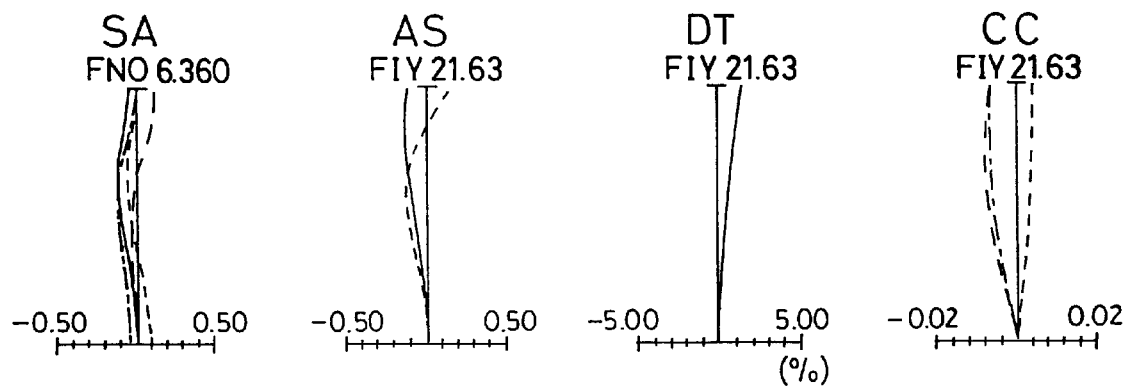
Figure 4C:
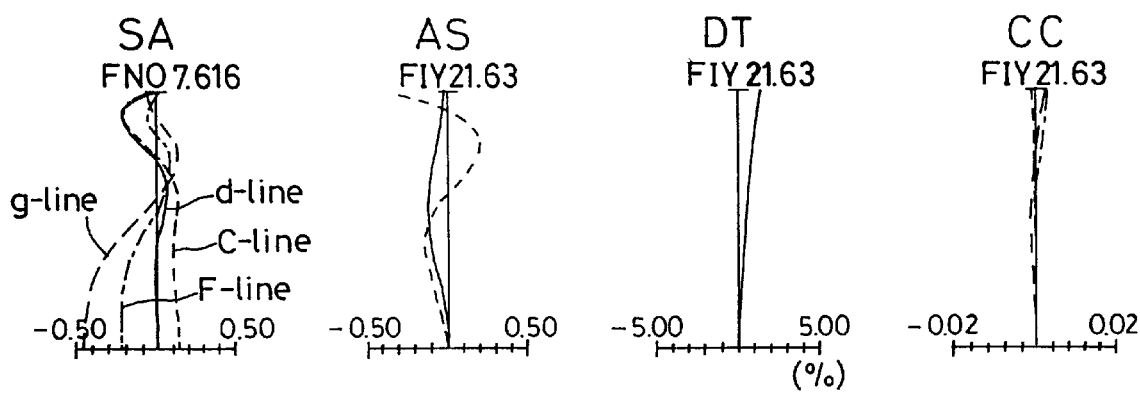

FIGS. 4(a), (b) and (c) are aberration diagrams for Example 1, showing spherical aberration SA, astigmatism AS, distortion DT and chromatic aberration of magnification CC at the wide-angle end, intermediate focal distance and telephoto end, respectively, with FIY standing for an image height. The same shall apply to FIGS. 5 to 8. From the results shown in FIG. 4, it is clear that satisfactory performance is maintained at each zooming position.

Figure 5A:
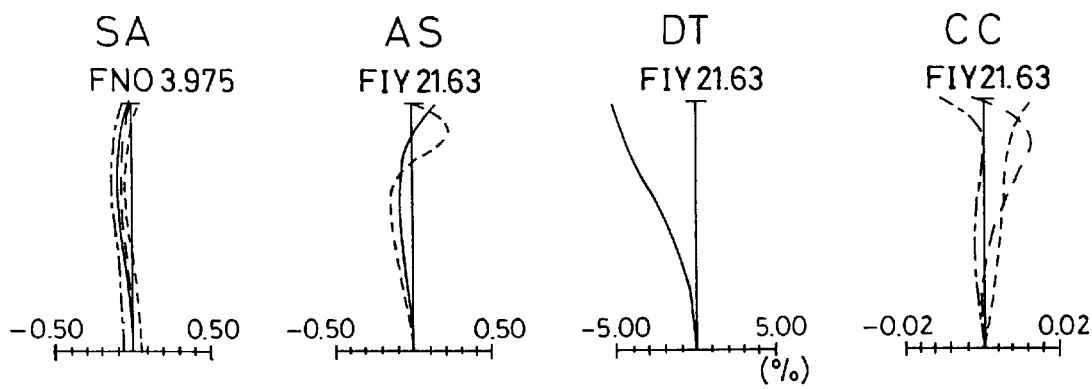
FIGS. 5(a), 5(b) and 5(c) are aberration diagrams for Example 2.
Figure 5B:
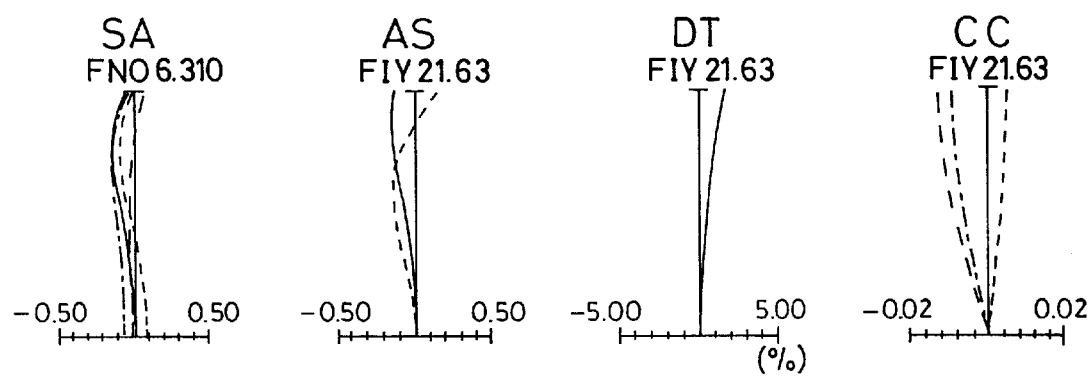
Figure 5C:
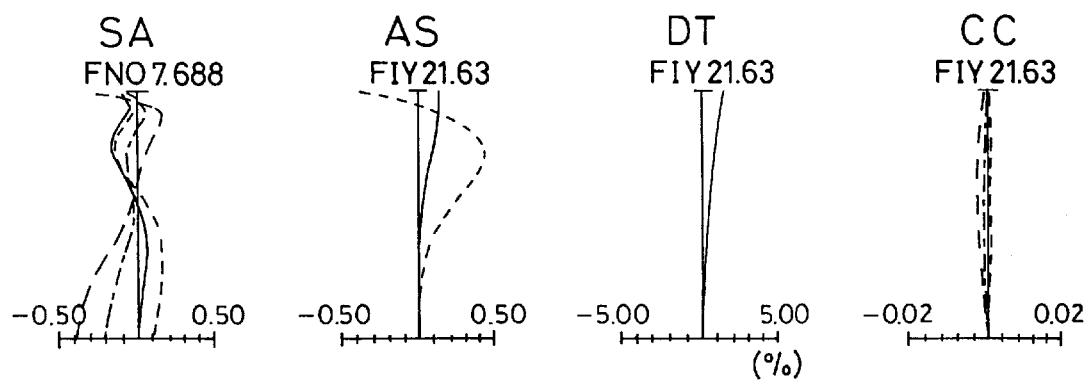

Example 2 is a zoom lens system having a focal length of 29.1 to 131 mm and an F-number of 3.975 to 7.688. A lens arrangement for this zoom lens system and the movement of each lens group during zooming are the same as in Example 1. Four aspherical surfaces are used, two for object-side surfaces of first and second lenses in a first lens group G1, one for an object-side surface of a single positive lens in a third lens group G3, and one for an image-side surface of a lens located on an object side of a fifth lens group G5. Aberration diagrams for this example are shown in FIG. 5.

Example 3 is a zoom lens system having a focal length of 29.1 to 131 mm and an F-number of 3.975 to 7.688. As shown in FIG. 2, a lens arrangement for this zoom lens system is constructed of a first lens group G1 made up of a positive meniscus lens convex on an object side of the system and a negative meniscus lens convex on the object side, a first lens group G2 made up of a doublet consisting of a double-convex positive lens and a double-concave negative lens, a third lens group G3 made up of a doublet consisting of a negative meniscus lens convex on the object side and a positive meniscus lens convex on the object side and a double-convex positive lens, a stop, a fourth lens group G4 made up of a doublet consisting of a positive meniscus lens having a strong curvature on an image side of the system and a double-concave negative lens, and a fifth lens group G5 made up of two positive meniscus lenses convex on the object side, each having relatively small refracting power. For zooming a wide-angle end of the system to a telephoto end of the system, the first lens group G1 moves slightly toward an image side of the system while it moves from the wide-angle end to an intermediate focal length, and moves toward the object side while it moves from the intermediate focal length to the telephoto side. The second to fifth lens groups G2, G3, G4 and G5 move such that from the wide-angle end to the telephoto end, a spacing between the first lens group G1 and the second lens group G2, a spacing between the second lens group G2 and the third lens group G3 and a spacing between the fourth lens group G4 and the fifth lens group G5 become narrow while a spacing between the third lens group G3 and the fourth lens group G4 becomes wide.

Figure 6A:
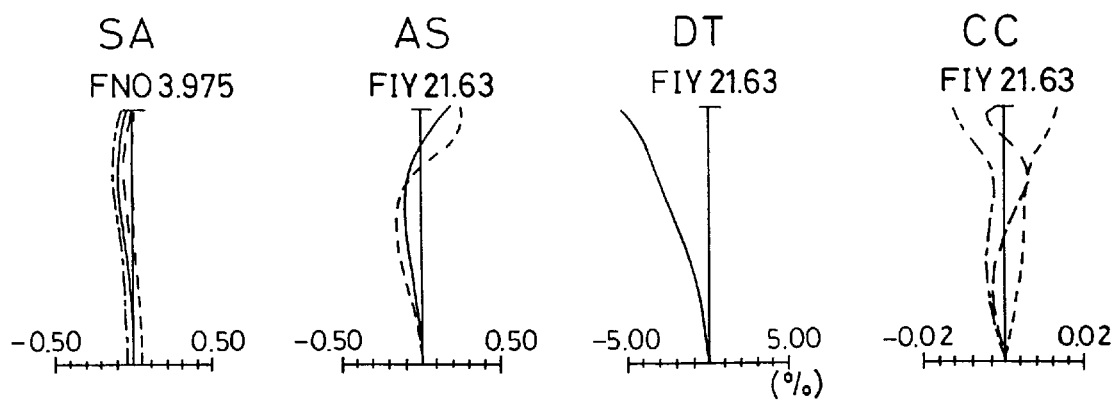
FIGS. 6(a), 6(b) and 6(c) are aberration diagrams for Example 3.
Figure 6B:
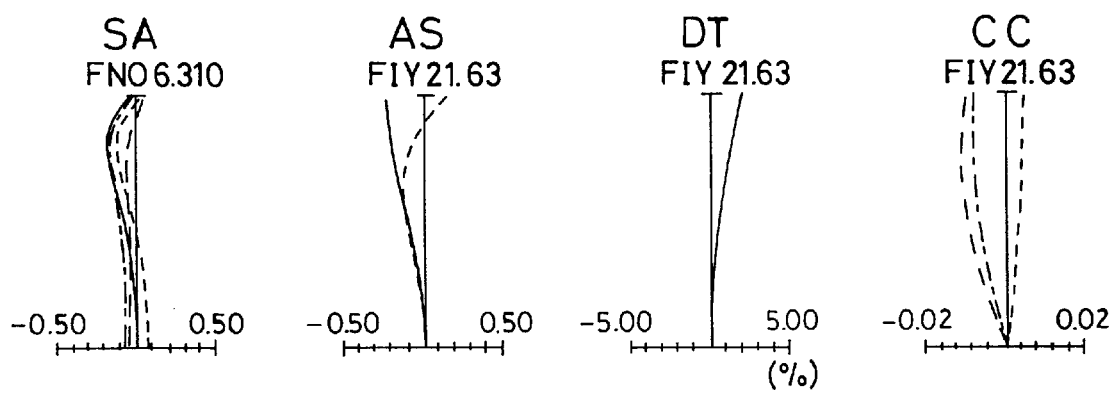
Figure 6C:
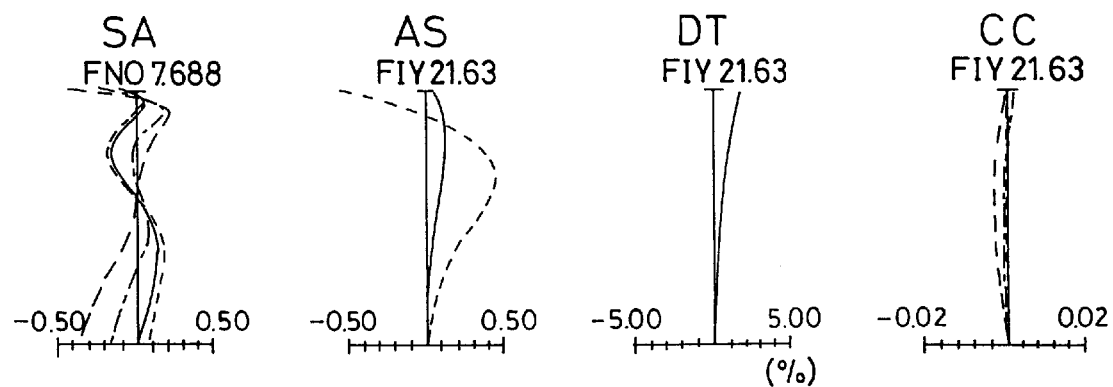

In the first lens group G1, two aspherical surfaces are used for object-side surfaces of first and second lenses. Additionally, three aspherical surfaces are used, one for a surface of the doublet nearest to the image side in the second lens group G2, one for an object-side surface of the single positive lens in the third lens group G3, and one for an image-side surface of the lens located on an object side of the fifth lens group G5. Aberration diagrams for this example are shown in FIG. 6.

Figure 7A:
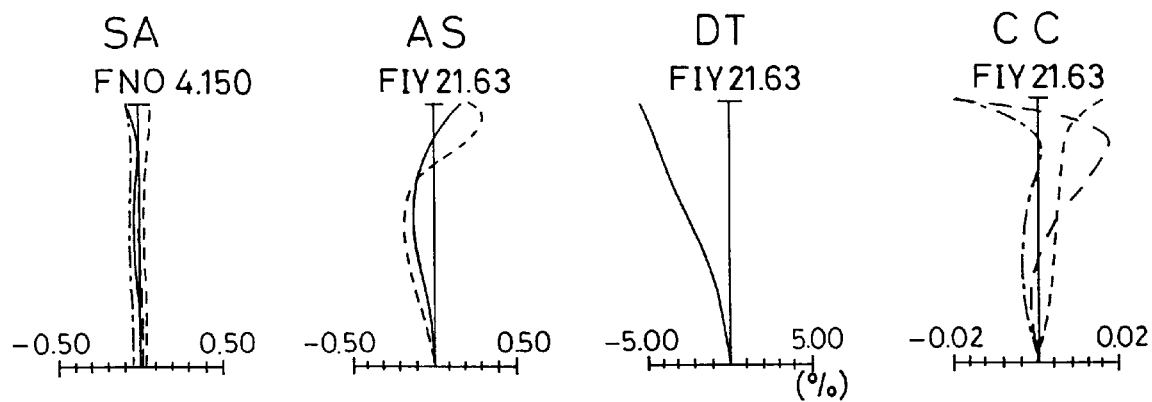
FIGS. 7(a), 7(b) and 7(c) are aberration diagrams for Example 4.
Figure 7B:
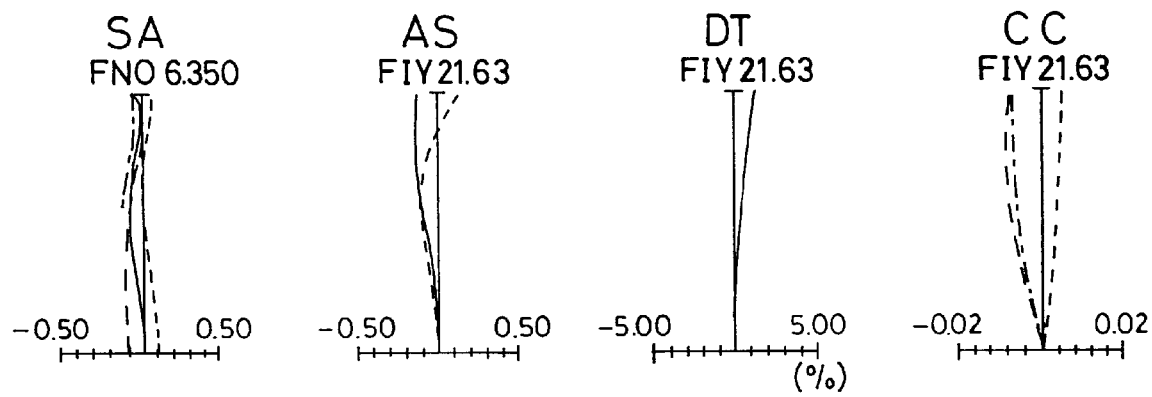
Figure 7C:
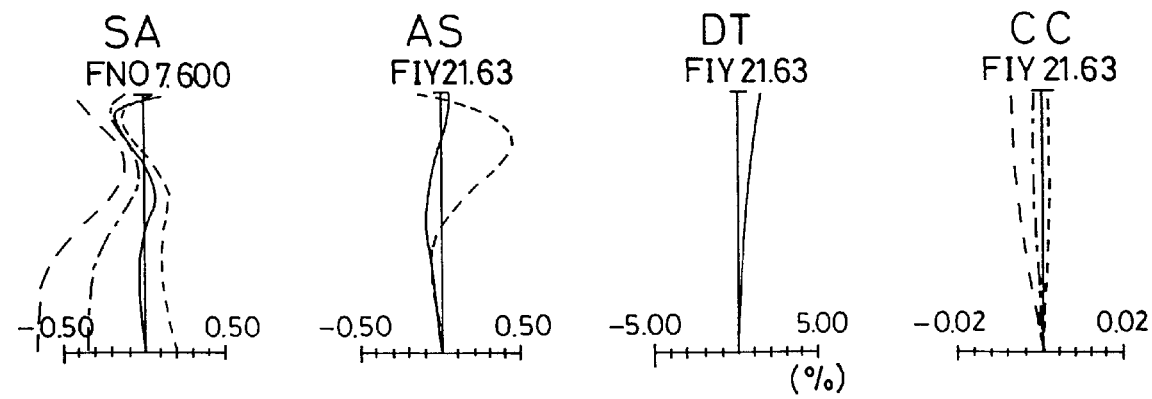

Example 4 is a zoom lens system having a focal length of 29.1 to 130.997 mm and an F-number of 4.15 to 7.6. A lens arrangement for this zoom lens system and the movement of each lens group during zooming are the same as in Example 1. Three aspherical surfaces are used, two for object-side surface of first and second lenses in a first lens group G1, and one for an image-side surface of a lens located on an object side of a fifth lens group G5. Aberration diagrams for this example are shown in FIG. 7.

Example 5 is a zoom lens system characterized by the construction of a first lens group G1, and a second lens group G2. In particular, the first lens group G1 is characterized in that the first or positive lens is constructed of a meniscus lens and the second lens group G2 is characterized in that the positive lens in a doublet is constructed of a meniscus lens. This zoom lens system has a focal length of 29.1 to 131 mm and an F-number of 4.15 to 7.6. A lens arrangement for the zoom lens system is explained with reference to FIG. 3. The first lens group G1 is made up of a positive meniscus lens convex on an object side of the system and a negative meniscus lens convex on the object side, and the second lens group G2 is made up of a doublet consisting of a positive meniscus lens convex on an image side of the system and a negative meniscus lens convex on the image side. A third lens group G3 is made up of a doublet consisting of a negative meniscus lens convex on the object side and a positive meniscus lens convex on the object side and a double-convex positive lens, a fourth lens group G4 is made up of a doublet consisting of a positive meniscus lens having a strong curvature on the image side and a double-concave negative lens with a stop located between it and the third lens group G3, and a fifth lens group G5 is made up of two positive meniscus lenses convex on the object side, each having a relatively small refracting power. For zooming a wide-angle end of the system to a telephoto end of the system, the first lens group G1 moves slightly toward the image side while it moves from the wide-angle end to an intermediate focal length, and moves toward the object side while it moves from the intermediate focal length to the telephoto side. The second to fifth lens groups G2, G3, G4 and G5 move such that from the wide-angle end to the telephoto end, a spacing between the first lens group G1 and the second lens group G2, a spacing between the second lens group G2 and the third lens group G3 and a spacing between the fourth lens group G4 and the fifth lens group G5 become narrow while a spacing between the third lens group G3 and the fourth lens group G4 becomes wide.

Figure 8A:
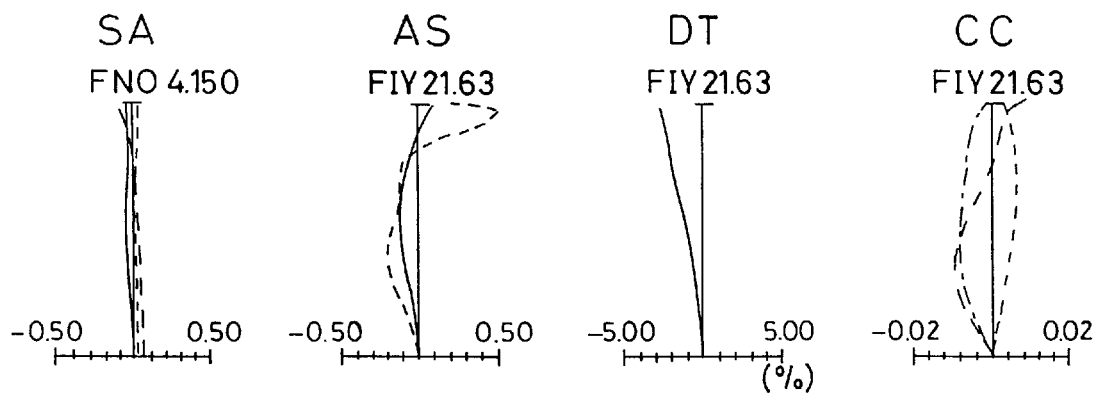
FIGS. 8(a), 8(b) and 8(c) are aberration diagrams for Example 5.
Figure 8B:
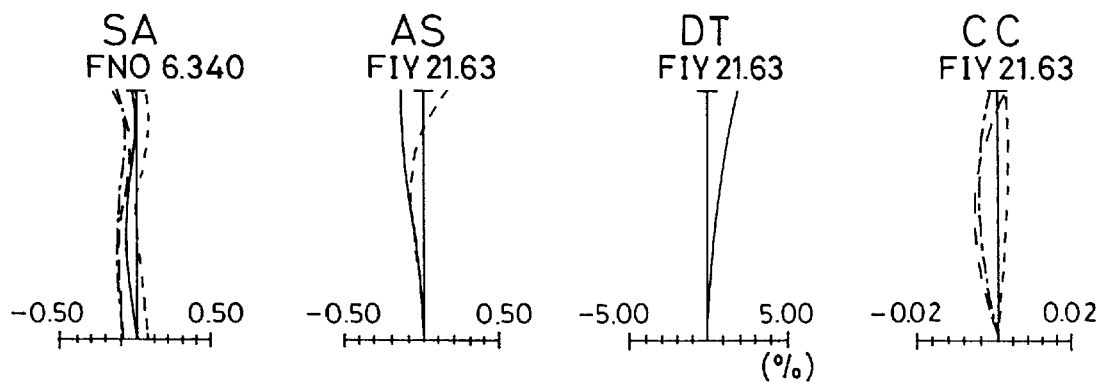
Figure 8C:
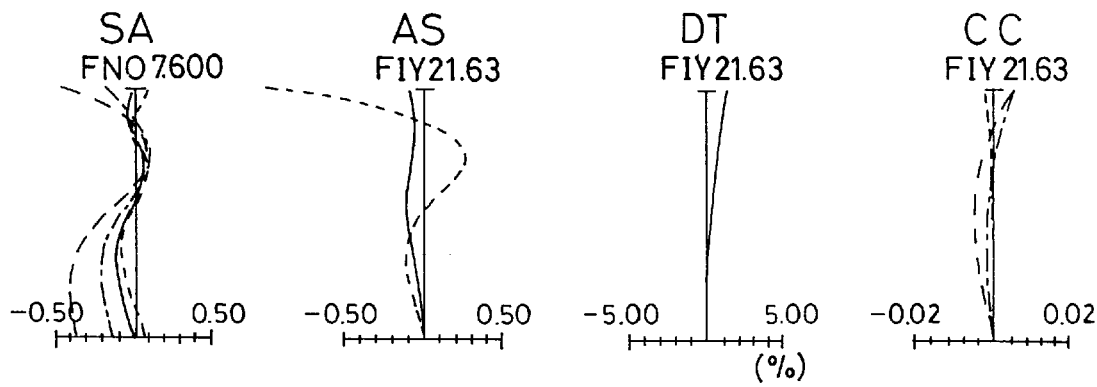

In the first lens group G1, two aspherical surfaces are used for surfaces of first and second lenses located on the object side. Additionally, one aspherical surface is used for an image-side surface of the lens located on an object side of the fifth lens group G5. Aberration diagrams for this example are shown in FIG. 8. From this it is found that distortion is well corrected.

Enumerated below are numerical data regarding Examples 1 to 5. Symbols used hereinafter but not hereinbefore have the following meanings:

f . . . focal length, $F_{NO}$ . . . F-number, $f_B$ . . . back focus, $r_1, r_2, \ldots$ radius of curvature of each lens surface, $d_1, d_2, \ldots$ spacing between adjacent lens surfaces, $n_{d1}, n_{d2}, \ldots$ d-line refractive index of each lens surface, and $\nu_{d1}, \nu_{d2}, \ldots$ d-line Abbe's number of each lens.

Here let a Z axis denote an optical axis direction and a Y axis indicate a direction perpendicular to the optical axis. Then, aspherical shape is given by $$Z=CY^2/[1+\sqrt{\{1-(1+K)C^2Y^2\}}]+A_4Y^4+A_6Y^6+A_8Y^8+A_{10}Y^{10}+A_{12}Y^{12}+ \quad (a)$$

where C is a curvature at a surface apex (=1/r where r is a radius of curvature), K is a conical coefficient, and $A_4$, $A_6$, $A_8$, $A_{10}$ and $A_{12}$ are fourth, sixth, eighth, tenth and twelfth aspherical coefficients.

Example 1

$f = 29.0991 \sim 69.9960 \sim 130.9896$
$F_{NO} = 4.1600 \sim 6.3600 \sim 7.6160$
$f_B = 38.3898 \sim 69.5870 \sim 107.0427$

| | | | | |
|---|---|---|---|---|
| $r_1 =$ | 110.7772 (Aspheric) | $d_1 = 6.3000$ | $n_{d1} = 1.63980$ | $\nu_{d1} = 34.46$ |
| $r_2 =$ | −274.3206 | $d_2 = 0.1000$ | | |
| $r_3 =$ | −515.1231 (Aspheric) | $d_3 = 1.7000$ | $n_{d2} = 1.77250$ | $\nu_{d2} = 49.60$ |
| $r_4 =$ | 25.3119 | $d_4 =$ (Variable) | | |
| $r_5 =$ | 25.1865 | $d_5 = 8.1500$ | $n_{d3} = 1.67270$ | $\nu_{d3} = 32.10$ |
| $r_6 =$ | −81.6447 | $d_6 = 1.7000$ | $n_{d4} = 1.78800$ | $\nu_{d4} = 47.37$ |
| $r_7 =$ | 25.3353 | $d_7 =$ (Variable) | | |
| $r_8 =$ | 27.8579 | $d_8 = 1.5000$ | $n_{d5} = 1.84666$ | $\nu_{d5} = 23.78$ |
| $r_9 =$ | 14.8976 | $d_9 = 6.5000$ | $n_{d6} = 1.72916$ | $\nu_{d6} = 54.68$ |
| $r_{10} =$ | 547.9666 | $d_{10} = 0.1500$ | | |
| $r_{11} =$ | 20.1083 | $d_{11} = 4.7000$ | $n_{d7} = 1.49700$ | $\nu_{d7} = 81.54$ |
| $r_{12} =$ | −116.0099 | $d_{12} =$ (Variable) | | |
| $r_{13} =$ | ∞ (Stop) | $d_{13} = 1.1000$ | | |
| $r_{14} =$ | −78.1299 | $d_{14} = 3.5000$ | $n_{d8} = 1.84666$ | $\nu_{d8} = 23.78$ |
| $r_{15} =$ | −13.7842 | $d_{15} = 1.4400$ | $n_{d9} = 1.80100$ | $\nu_{d9} = 34.97$ |
| $r_{16} =$ | 28.5044 | $d_{16} =$ (Variable) | | |
| $r_{17} =$ | 119.3379 | $d_{17} = 1.5000$ | $n_{d10} = 1.77250$ | $\nu_{d10} = 49.60$ |
| $r_{18} =$ | 179.4146 (Aspheric) | $d_{18} = 0.1500$ | | |
| $r_{19} =$ | 17.3375 | $d_{19} = 1.6000$ | $n_{d11} = 1.48749$ | $\nu_{d11} = 70.23$ |
| $r_{20} =$ | 20.2679 | | | |

Zooming Spaces

| f | 29.0991 | 69.9960 | 130.9896 |
|---|---|---|---|
| $d_4$ | 31.0500 | 15.8386 | 11.7000 |
| $d_7$ | 25.5500 | 8.9689 | 1.5542 |
| $d_{12}$ | 1.0000 | 2.7397 | 5.4679 |
| $d_{16}$ | 7.1325 | 5.2870 | 2.1650 |

Aspherical Coefficients

1st surface $K = 0$
$A_4 = 2.8253 \times 10^{-6}$
$A_6 = -7.7143 \times 10^{-9}$
$A_8 = 2.7483 \times 10^{-12}$
$A_{10} = -4.9169 \times 10^{-16}$ 2rd surface $K = 0$
$A_4 = -1.9662 \times 10^{-6}$
$A_6 = 1.3180 \times 10^{-8}$
$A_8 = -1.7285 \times 10^{-11}$
$A_{10} = 1.2484 \times 10^{-14}$ 18th surface $K = 0$
$A_4 = 3.0957 \times 10^{-5}$
$A_6 = 1.6750 \times 10^{-7}$
$A_8 = -9.5265 \times 10^{-10}$
$A_{10} = 1.2912 \times 10^{-11}$
$A_{12} = -1.9623 \times 10^{-15}$

Example 2

$f = 29.1000 \sim 70.0001 \sim 131.0002$
$F_{NO} = 3.9750 \sim 6.3100 \sim 7.6880$
$f_B = 38.4269 \sim 69.5305 \sim 110.1346$

| | | | | |
|---|---|---|---|---|
| $r_1 =$ | 97.2831 (Aspheric) | $d_1 = 6.300$ | $n_{d1} = 1.60562$ | $\nu_{d1} = 43.70$ |
| $r_2 =$ | −362.7597 | $d_2 = 0.1200$ | | |
| $r_3 =$ | −1281.9831 (Aspheric) | $d_3 = 1.7000$ | $n_{d2} = 1.77250$ | $\nu_{d2} = 49.60$ |
| $r_4 =$ | 24.9675 | $d_4 =$ (Variable) | | |
| $r_5 =$ | 30.6187 | $d_5 = 8.1500$ | $n_{d3} = 1.66680$ | $\nu_{d3} = 33.05$ |
| $r_6 =$ | −41.0492 | $d_6 = 1.7000$ | $n_{d4} = 1.77250$ | $\nu_{d4} = 49.60$ |
| $r_7 =$ | 34.6861 | $d_7 =$ (Variable) | | |
| $r_8 =$ | 30.1586 | $d_8 = 1.5000$ | $n_{d5} = 1.80518$ | $\nu_{d5} = 25.42$ |
| $r_9 =$ | 14.8510 | $d_9 = 6.5000$ | $n_{d6} = 1.75500$ | $\nu_{d6} = 52.32$ |
| $r_{10} =$ | 446.4137 | $d_{10} = 0.1500$ | | |
| $r_{11} =$ | 19.8867 (Aspheric) | $d_{11} = 4.7000$ | $n_{d7} = 1.49700$ | $\nu_{d7} = 81.54$ |
| $r_{12} =$ | −81.2541 | $d_{12} =$ (Variable) | | |
| $r_{13} =$ | ∞ (Stop) | $d_{13} = 1.1000$ | | |
| $r_{14} =$ | −62.3441 | $d_{14} = 3.5000$ | $n_{d8} = 1.84666$ | $\nu_{d8} = 23.78$ |

-continued

| | | | | |
|---|---|---|---|---|
| $r_{15} =$ | −14.0392 | $d_{15} = 1.4400$ | $n_{d9} = 1.80100$ | $\nu_{d9} = 34.97$ |
| $r_{16} =$ | 25.2328 | $d_{16} =$ (Variable) | | |
| $r_{17} =$ | 46.0269 | $d_{17} = 1.5000$ | $n_{d10} = 1.74100$ | $\nu_{d10} = 52.64$ |
| $r_{18} =$ | 57.4920 (Aspheric) | $d_{18} = 0.1500$ | | |
| $r_{19} =$ | 16.9664 | $d_{19} = 1.6000$ | $n_{d11} = 1.48749$ | $\nu_{d11} = 70.23$ |
| $r_{20} =$ | 19.9389 | | | |

Zooming Spaces

| f | 29.1000 | 70.0001 | 131.0002 |
|---|---|---|---|
| $d_4$ | 31.0500 | 15.9894 | 11.7000 |
| $d_7$ | 25.5300 | 8.3492 | 1.0000 |
| $d_{12}$ | 1.000 | 1.8956 | 3.2715 |
| $d_{16}$ | 4.1071 | 3.7244 | 1.8510 |

Aspherical Coefficients

1st surface $K = 0$
$A_4 = 4.1871 \times 10^{-6}$
$A_6 = -8.2676 \times 10^{-9}$
$A_8 = 3.2863 \times 10^{-12}$
$A_{10} = -1.0949 \times 10^{-15}$ 2rd surface $K = 0$
$A_4 = -3.5604 \times 10^{-6}$
$A_6 = 1.5475 \times 10^{-8}$
$A_8 = -2.0127 \times 10^{-11}$
$A_{10} = 1.2931 \times 10^{-14}$ 11th surface $K = 0$
$A_4 = 2.9853 \times 10^{-6}$
$A_6 = 5.2472 \times 10^{-9}$
$A_8 = -1.1733 \times 10^{-10}$
$A_{10} = 1.4765 \times 10^{-13}$ 18th surface $K = 0$
$A_4 = 4.0187 \times 10^{-5}$
$A_6 = 1.7033 \times 10^{-7}$
$A_8 = -9.9266 \times 10^{-10}$
$A_{10} = 1.9035 \times 10^{-11}$
$A_{12} = -5.1569 \times 10^{-14}$ Example 3

$f = 29.1000 \sim 70.0001 \sim 131.0002$
$F_{NO} = 3.9750 \sim 6.3100 \sim 7.6880$
$f_B = 38.4174 \sim 69.0232 \sim 110.1010$

| | | | | |
|---|---|---|---|---|
| $r_1 =$ | 92.8815 (Aspheric) | $d_1 = 6.0000$ | $n_{d1} = 1.78590$ | $\nu_{d1} = 44.20$ |
| $r_2 =$ | 663.0690 | $d_2 = 1.0000$ | | |
| $r_3 =$ | 205.0203 (Aspheric) | $d_3 = 1.7000$ | $n_{d2} = 1.77250$ | $\nu_{d2} = 49.60$ |
| $r_4 =$ | 23.4692 | $d_4 =$ (Variable) | | |
| $r_5 =$ | 33.3683 | $d_5 = 8.1500$ | $n_{d3} = 1.67270$ | $\nu_{d3} = 32.10$ |
| $r_6 =$ | −24.5633 | $d_6 = 1.7000$ | $n_{d4} = 1.78590$ | $\nu_{d4} = 44.20$ |
| $r_7 =$ | 38.2993 (Aspheric) | $d_7 =$ (Variable) | | |
| $r_8 =$ | 33.5019 | $d_8 = 1.5000$ | $n_{d5} = 1.80518$ | $\nu_{d5} = 25.42$ |
| $r_9 =$ | 14.8596 | $d_9 = 6.5000$ | $n_{d6} = 1.77250$ | $\nu_{d6} = 49.60$ |
| $r_{10} =$ | 816.6830 | $d_{10} = 0.1500$ | | |
| $r_{11} =$ | 19.5734 (Aspheric) | $d_{11} = 4.7000$ | $n_{d7} = 1.49700$ | $\nu_{d7} = 81.54$ |
| $r_{12} =$ | −72.5284 | $d_{12} =$ (Variable) | | |
| $r_{13} =$ | ∞ (Stop) | $d_{13} = 1.1000$ | | |
| $r_{14} =$ | −63.0566 | $d_{14} = 3.5000$ | $n_{d8} = 1.84666$ | $\nu_{d8} = 23.78$ |
| $r_{15} =$ | −14.0979 | $d_{15} = 1.4400$ | $n_{d9} = 1.80100$ | $\nu_{d9} = 34.97$ |
| $r_{16} =$ | 27.5469 | $d_{16} =$ (Variable) | | |
| $r_{17} =$ | 41.4504 | $d_{17} = 1.5000$ | $n_{d10} = 1.72916$ | $\nu_{d10} = 54.68$ |
| $r_{18} =$ | 46.4736 (Aspheric) | $d_{18} = 0.1500$ | | |
| $r_{19} =$ | 16.3490 | $d_{19} = 1.6000$ | $n_{d11} = 1.48749$ | $\nu_{d11} = 70.23$ |
| $r_{20} =$ | 18.8579 | | | |

Zooming Spaces

| f | 29.1000 | 70.0001 | 131.0002 |
|---|---|---|---|
| $d_4$ | 31.0500 | 16.1816 | 11.7000 |

-continued

|     |         |        |        |
|-----|---------|--------|--------|
| d₇  | 24.9500 | 8.0674 | 1.0000 |
| d₁₂ | 1.000   | 1.7160 | 2.9034 |
| d₁₆ | 3.2419  | 3.2148 | 1.6632 |

Aspherical Coefficients

1st surface $K = 0$
$A_4 = 2.7343 \times 10^{-6}$
$A_6 = -6.6012 \times 10^{-9}$
$A_8 = 1.1178 \times 10^{-12}$
$A_{10} = 5.3972 \times 10^{-16}$ 2rd surface $K = 0$
$A_4 = -3.6323 \times 10^{-6}$
$A_6 = 1.8262 \times 10^{-8}$
$A_8 = -1.9739 \times 10^{-11}$
$A_{10} = 1.4953 \times 10^{-14}$ 7th surface $K = 0$
$A_4 = -3.5896 \times 10^{-6}$
$A_6 = 2.3576 \times 10^{-9}$
$A_8 = -3.2484 \times 10^{-11}$
$A_{10} = 2.5204 \times 10^{-14}$ 11th surface $K = 0$
$A_4 = 3.7474 \times 10^{-6}$
$A_6 = 8.3047 \times 10^{-9}$
$A_8 = -1.7961 \times 10^{-10}$
$A_{10} = 9.4037 \times 10^{-14}$ 18th surface $K = 0$
$A_4 = 4.6802 \times 10^{-5}$
$A_6 = 1.4362 \times 10^{-7}$
$A_8 = 1.2427 \times 10^{-10}$
$A_{10} = 5.1066 \times 10^{-12}$
$A_{12} = 5.9760 \times 10^{-15}$ Example 4

$f = 29.1000 \sim 69.9990 \sim 130.9970$
$F_{NO} = 4.1500 \sim 6.3500 \sim 7.6000$
$f_B = 38.3762 \sim 69.5874 \sim 106.9385$

| | | | | |
|---|---|---|---|---|
| $r_1 =$ | 117.0011 (Aspheric) | $d_1 = 6.3000$ | $n_{d1} = 1.63980$ | $\nu_{d1} = 34.46$ |
| $r_2 =$ | −183.8966 | $d_2 = 0.1000$ | | |
| $r_3 =$ | −263.7860 (Aspheric) | $d_3 = 1.7000$ | $n_{d2} = 1.77250$ | $\nu_{d2} = 49.60$ |
| $r_4 =$ | 25.8675 | $d_4 =$ (Variable) | | |
| $r_5 =$ | 25.2364 | $d_5 = 8.1500$ | $n_{d3} = 1.67270$ | $\nu_{d3} = 32.10$ |
| $r_6 =$ | −85.2309 | $d_6 = 1.7000$ | $n_{d4} = 1.78800$ | $\nu_{d4} = 47.37$ |
| $r_7 =$ | 25.2434 | $d_7 =$ (Variable) | | |
| $r_8 =$ | 28.0257 | $d_8 = 1.5000$ | $n_{d5} = 1.84666$ | $\nu_{d5} = 23.78$ |
| $r_9 =$ | 14.9126 | $d_9 = 6.5000$ | $n_{d6} = 1.72916$ | $\nu_{d6} = 54.68$ |
| $r_{10} =$ | 562.1535 | $d_{10} = 0.1500$ | | |
| $r_{11} =$ | 20.1736 | $d_{11} = 4.7000$ | $n_{d7} = 1.49700$ | $\nu_{d7} = 81.54$ |
| $r_{12} =$ | −118.8279 | $d_{12} =$ (Variable) | | |
| $r_{13} =$ | ∞ (Stop) | $d_{13} = 1.1000$ | | |
| $r_{14} =$ | −79.0477 | $d_{14} = 3.5000$ | $n_{d8} = 1.84666$ | $\nu_{d8} = 23.78$ |
| $r_{15} =$ | −13.6289 | $d_{15} = 1.4400$ | $n_{d9} = 1.80100$ | $\nu_{d9} = 34.97$ |
| $r_{16} =$ | 29.0975 | $d_{16} =$ (Variable) | | |
| $r_{17} =$ | 100.7239 | $d_{17} = 1.5000$ | $n_{d10} = 1.77250$ | $\nu_{d10} = 49.60$ |
| $r_{18} =$ | 130.5057 (Aspheric) | $d_{18} = 0.1500$ | | |
| $r_{19} =$ | 17.0659 | $d_{19} = 1.6000$ | $n_{d11} = 1.48749$ | $\nu_{d11} = 70.23$ |
| $r_{20} =$ | 20.0181 | | | |

Zooming Spaces

| f | 29.1000 | 69.9990 | 130.9970 |
|---|---------|---------|----------|
| d₄ | 31.0500 | 15.7544 | 11.7000 |
| d₇ | 25.5500 | 8.9967 | 1.5286 |
| d₁₂ | 1.0000 | 2.8253 | 5.6678 |
| d₁₆ | 7.4544 | 5.4001 | 2.0890 |

-continued

Aspherical Coefficients

1st surface $K = 0$
$A_4 = 1.7359 \times 10^{-6}$
$A_6 = -6.2967 \times 10^{-9}$
$A_8 = 2.5502 \times 10^{-12}$
$A_{10} = -6.5694 \times 10^{-16}$ 2rd surface $K = 0$
$A_4 = -8.2143 \times 10^{-7}$
$A_6 = 9.9854 \times 10^{-9}$
$A_8 = -1.4034 \times 10^{-11}$
$A_{10} = 1.0488 \times 10^{-14}$ 18th surface $K = 0$
$A_4 = 3.1795 \times 10^{-5}$
$A_6 = 1.7015 \times 10^{-7}$
$A_8 = -1.0898 \times 10^{-9}$
$A_{10} = 1.4500 \times 10^{-11}$
$A_{12} = -7.3896 \times 10^{-15}$

Example 5

$f = 29.1000 \sim 70.0000 \sim 131.0000$
$F_{NO} = 4.1500 \sim 6.3400 \sim 7.6000$
$f_B = 38.3861 \sim 69.7484 \sim 109.9664$

| | | | | |
|---|---|---|---|---|
| $r_1 =$ | 36.3638 (Aspheric) | $d_1 = 7.0000$ | $n_{d1} = 1.84666$ | $\nu_{d1} = 23.78$ |
| $r_2 =$ | 53.8382 | $d_2 = 0.5000$ | | |
| $r_3 =$ | 58.2565 (Aspheric) | $d_3 = 1.7000$ | $n_{d2} = 1.77250$ | $\nu_{d2} = 49.60$ |
| $r_4 =$ | 20.5135 | $d_4 =$ (Variable) | | |
| $r_5 =$ | -60.9835 | $d_5 = 4.7000$ | $n_{d3} = 1.67270$ | $\nu_{d3} = 32.10$ |
| $r_6 =$ | -27.4245 | $d_6 = 1.3500$ | $n_{d4} = 1.78800$ | $\nu_{d4} = 47.37$ |
| $r_7 =$ | -245.7954 | $d_7 =$ (Variable) | | |
| $r_8 =$ | 37.4160 | $d_8 = 1.0000$ | $n_{d5} = 1.84666$ | $\nu_{d5} = 23.78$ |
| $r_9 =$ | 18.4006 | $d_9 = 4.7000$ | $n_{d6} = 1.72916$ | $\nu_{d6} = 54.68$ |
| $r_{10} =$ | 400.7791 | $d_{10} = 0.1500$ | | |
| $r_{11} =$ | 21.2191 | $d_{11} = 6.9000$ | $n_{d7} = 1.49700$ | $\nu_{d7} = 81.54$ |
| $r_{12} =$ | -163.1616 | $d_{12} =$ (Variable) | | |
| $r_{13} =$ | ∞ (Stop) | $d_{13} = 1.0000$ | | |
| $r_{14} =$ | -119.5507 | $d_{14} = 3.2500$ | $n_{d8} = 1.84666$ | $\nu_{d8} = 23.78$ |
| $r_{15} =$ | -14.7627 | $d_{15} = 1.2000$ | $n_{d9} = 1.80100$ | $\nu_{d9} = 34.97$ |
| $r_{16} =$ | 40.9988 | $d_{16} =$ (Variable) | | |
| $r_{17} =$ | 134.4054 | $d_{17} = 1.2500$ | $n_{d10} = 1.77250$ | $\nu_{d10} = 49.60$ |
| $r_{18} =$ | 212.6147 (Aspheric) | $d_{18} = 0.1500$ | | |
| $r_{19} =$ | 18.1971 | $d_{19} = 1.7000$ | $n_{d11} = 1.48749$ | $\nu_{d11} = 70.23$ |
| $r_{20} =$ | 21.4921 | | | |

Zooming Spaces

| f | 29.1000 | 70.0000 | 131.0000 |
|---|---|---|---|
| $d_4$ | 23.6741 | 18.3305 | 12.2908 |
| $d_7$ | 34.7500 | 8.8868 | 1.0000 |
| $d_{12}$ | 2.3259 | 4.0848 | 6.3544 |
| $d_{16}$ | 6.5774 | 4.6767 | 1.8645 |

Aspherical Coefficients

1st surface $K = 0$
$A_4 = 6.0788 \times 10^{-7}$
$A_6 = -1.3720 \times 10^{-9}$
$A_8 = -2.4116 \times 10^{-12}$
$A_{10} = 4.6638 \times 10^{-16}$ 2rd surface $K = 0$
$A_4 = 1.3320 \times 10^{-6}$
$A_6 = 6.6670 \times 10^{-9}$
$A_8 = -4.8886 \times 10^{-12}$
$A_{10} = 5.3241 \times 10^{-15}$ -continued 18th surface K = 0
$A_4 = 2.9838 \times 10^{-5}$
$A_6 = 1.8633 \times 10^{-7}$
$A_8 = -2.9434 \times 10^{-9}$
$A_{10} = 4.4560 \times 10^{-11}$
$A_{12} = -1.9302 \times 10^{-13}$ Tabulated below are values for conditions (1) to (5) in Examples 1 to 5.

| | Condition | | | | |
|---|---|---|---|---|---|
| | (1) | (2) | (3) | (4) | (5) |
| Ex. 1 | 1.4920 | 0.7782 | 4.444 | 4.1492 | 4.9002 |
| Ex. 2 | 1.5157 | 0.8850 | 4.501 | 4.0691 | 5.0995 |
| Ex. 3 | 1.6804 | 0.8196 | 4.150 | 4.9647 | 5.8018 |
| Ex. 4 | 1.4923 | 0.7663 | 4.88 | 5.0813 | 5.2552 |
| Ex. 5 | 2.7644 | 0.6098 | 4.214 | 4.9341 | 3.4147 |

Figure 9A:
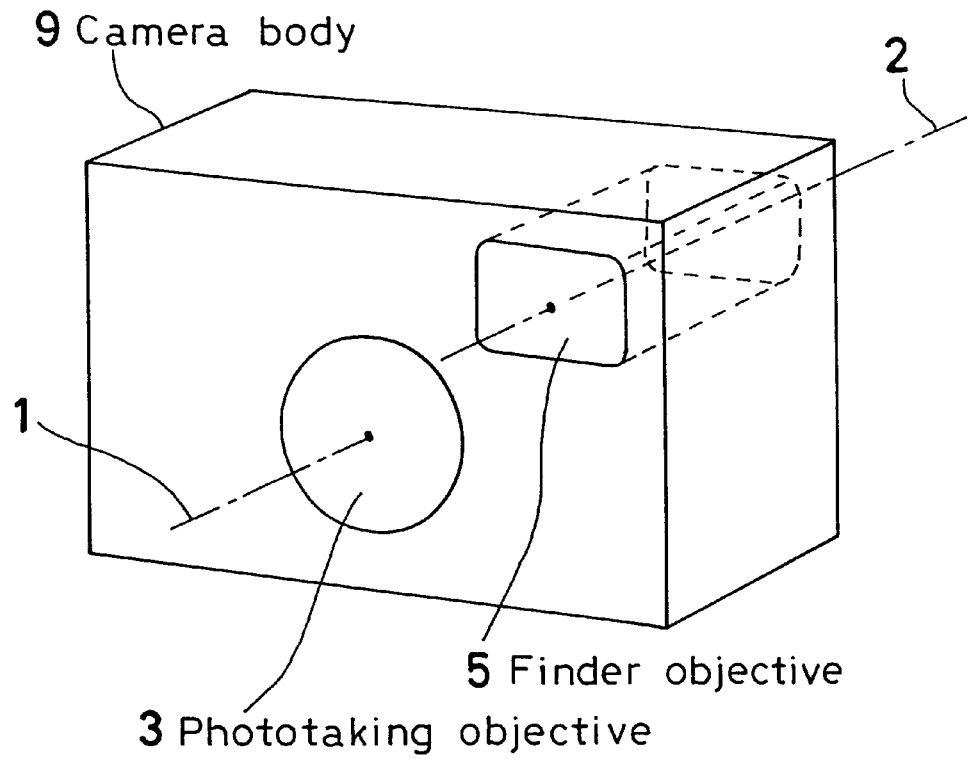
FIGS. 9(a) and 9(b) illustrate a compact camera to which the zoom lens system of the present invention is applicable.
Figure 9B:
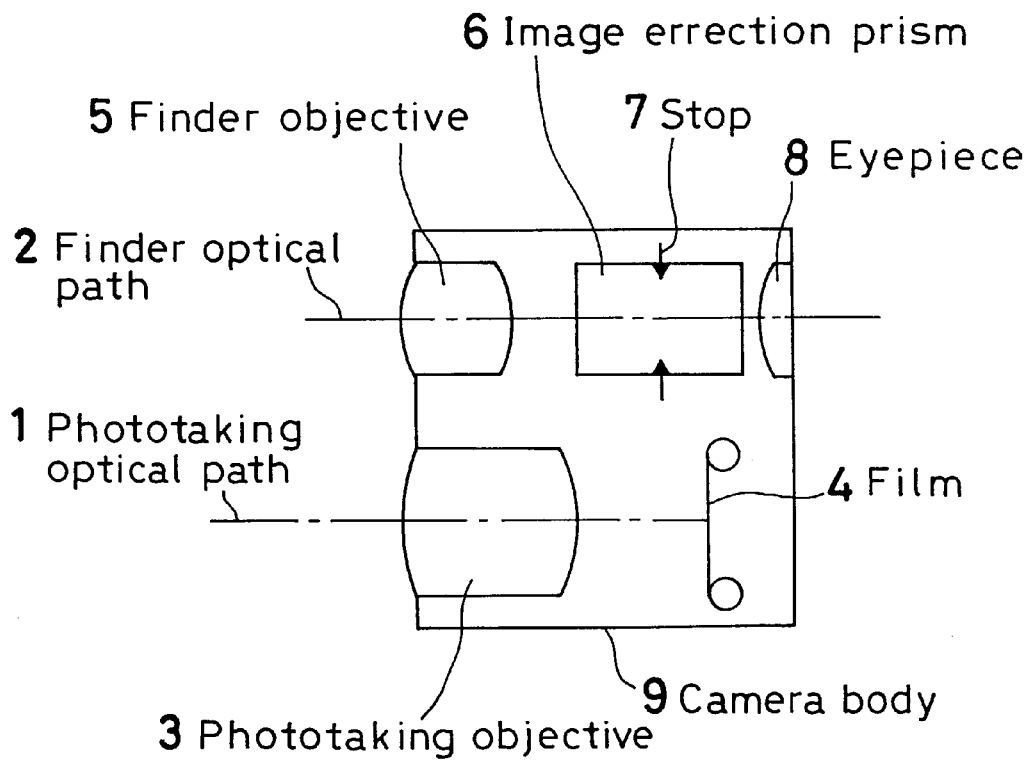

The zoom lens system of the present invention as explained above may be used as a phototaking objective for a compact camera designed as shown in FIG. 9. FIG. 9(a) is a perspective view of the compact camera and FIG. 9(c) is an optical path diagram, wherein reference numeral 9 represents a camera body, 1 a phototaking optical path, and 2 a finder optical path. The phototaking optical path 1 is parallel with the finder optical path 2, and an subject's image is observed through a finder comprising a finder objective 5, an image erection prism 6, a stop 7 and an eyepiece 8, and is formed on film 4 through a phototaking objective 3.

Figure 10A:
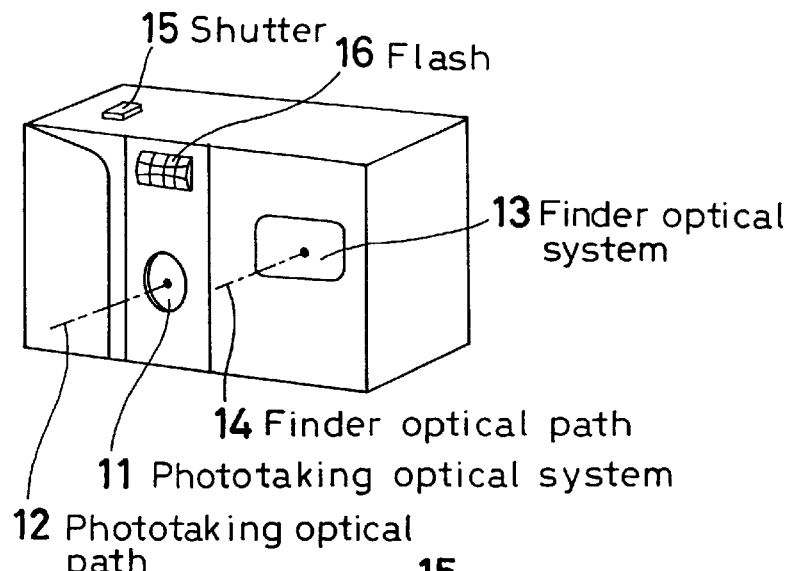
FIGS. 10(a), 10(b) and 10(c) illustrate an electronic camera to which the zoom lens system of the present invention is applicable.
Figure 10B:
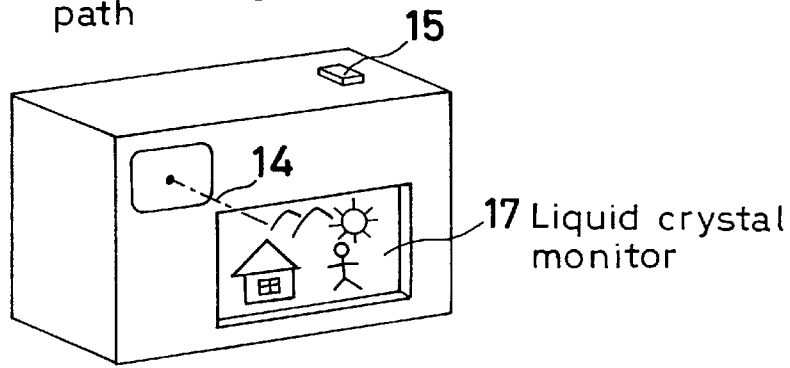
Figure 10C:
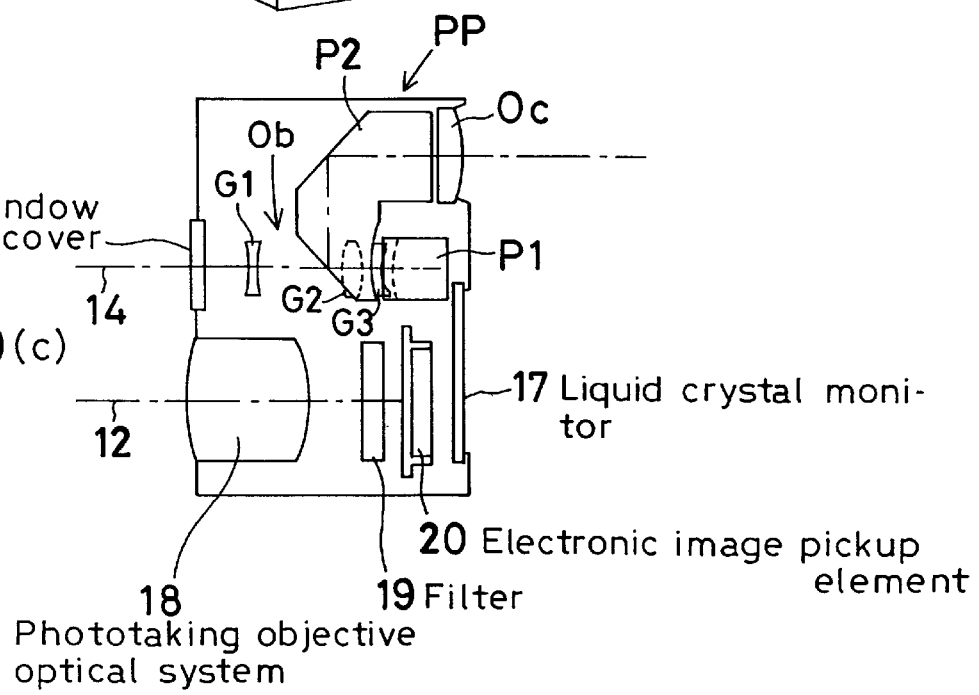

The zoom lens system of the present invention may also be used as a phototaking objective optical system 18 for an electronic camera as typically shown in FIG. 10. FIG. 10(a) is a front perspective view of the electronic camera, FIG. 10(b) is a rear perspective view of the electronic camera, and FIG. 10(c) is an optical path illustrative of an electronic camera optical system. The electronic camera comprises a phototaking optical system 11 having a phototaking optical path 12, a finder optical system 13 having a finder optical path 14, a shutter 15, a flash 16, a liquid crystal display monitor 17, etc. The finder optical system 13 is a direct-vision view finder comprising an objective optical system Ob, an image inversion optical system PP and an eyepiece optical system Oc. It is here to be noted that a transparent finder window cover 21 is provided on an incident side of the objective optical system Ob in the finder optical system 13.

The phototaking optical system 11 comprises a phototaking objective optical system 18, a filter 19 such as an infrared cut filter, and an electronic image pickup device 20 located on an image formation plane of the phototaking optical system 18. A subject's image picked up by the electronic image pickup device 20 or an image recorded by a recorder is displayed on the liquid crystal display monitor 17.

As can be clearly understood from the foregoing explanation, the present invention makes it possible to achieve a wide-angle yet high-magnification zoom lens system with a simple lens arrangement. The construction of the first lens group is complicated when correction of distortion occurring at the wide-angle end is taken into consideration, so an aspherical surface is advantageously used within the first lens group, through which a marginal ray bundle passes at the wide-angle end. This enables the first lens group of the wide-angle yet high-magnification zoom lens system to be constructed of two lenses. To achieve sufficient performance even at peripheries, the second lens group is used and an image plane-correcting lens group is located in the fifth lens group. As a result, it is possible to obtain high image formation capabilities.

What we claim is:

1. A wide-angle zoom lens system comprising, in order from an object side thereof:

a first lens group having negative refracting power;

a second lens group;

a third lens group having negative refracting power; and a fifth lens group, wherein, to zoom from a wide-angle end of said lens system to a telephoto end of said lens system, said first lens group moves nonlinearly and said second lens group, said third lens group, said fourth lens group and said fifth lens group move toward said object side, said lens groups move such that a spacing between said first lens group and said second lens group, a spacing between said second lens group and said third lens group, and a spacing between said fourth lens group and said fifth lens group become narrow while a spacing between said third lens group and said fourth lens group becomes wide, an aspherical surface is used in at least said first lens group, and said system satisfies the following conditions (1) and (4):

$$0.7 < |f_1/f_w| < 3 \quad (1)$$

$$3 < |f_5|/f_w < 8 \quad (4)$$

where $f_1$ is a focal length of said first lens group, $f_5$ is a focal length of said fifth lens group, and $f_w$ is a focal length of said zoom lens system at said wide-angle end.

2. A wide-angle zoom lens system comprising, in order from an object side thereof:

a first lens group having negative refracting power;

a second lens group;

a third lens group having positive refracting power;

a fourth lens group having negative refracting power; and a fifth lens group, wherein, to zoom from a wide-angle end of said lens system to a telephoto end of said lens system, said first lens group moves nonlinearly and said second lens group, said third lens group, said fourth lens group and said fifth lens group move toward said object side, said lens groups move such that a spacing between said first lens group and said second lens group, a spacing between said second lens group and said third lens group, and a spacing between said fourth lens group and said fifth lens group become narrow while a spacing between said third lens group and said fourth lens group becomes wide, an aspherical surface is used in at least said first lens group, and said system satisfies the following conditions (2) and (4):

$$0.3 < |f_3/f_4| < 1 \tag{2}$$

$$3 < |f_5|/f_w < 8 \tag{4}$$

where $f_3$ is a focal length of said third lens group, $f_4$ is a focal length of said fourth lens group, $f_5$ is a focal length of said fifth lens group, and $f_w$ is a focal length of said zoom lens system at said wide-angle end.

3. A wide-angle zoom lens system comprising, in order from an object side thereof:

a first lens group having negative refracting power:

a second lens group;

a third lens group having positive refracting power;

a fourth lens group having negative refracting power; and a fifth lens group, wherein, to zoom from a wide-angle end of said lens system to a telephoto end of said lens system, said first lens group moves nonlinearly and said second lens group, said third lens group, said fourth lens group and said fifth lens group move toward said object side, said lens groups move such that a spacing between said first lens group and said second lens group, a spacing between said second lens group and said third lens group, and a spacing between said fourth lens group and said fifth lens group become narrow while a spacing between said third lens group and said fourth lens group becomes wide, an aspherical surface is used in at least said first lens group, and said system satisfies the following conditions (3) and (4):

$$0.3 < m_{345W}/m_{345T} < 6 \tag{3}$$

$$3 < |f_5|/f_w < 8 \tag{4}$$

where $m_{345W}$ is a magnification of said third lens group to said fifth lens group at said wide-angle end, $m_{345T}$ is a magnification of said third lens group to said fifth lens group at said telephoto end, $f_5$ is a focal length of said fifth lens group, and $f_w$ is a focal length of said zoom lens system at said wide-angle end.

4. A wide-angle zoom lens system comprising, in order from an object side thereof:

a first lens group having negative refracting power;

a second lens group, a third lens group having negative refracting power; and a fifth lens group, wherein to zoom from a wide-angle end of said lens system to a telephoto end of said lens system, said first lens group moves nonlinearly and said second lens group, said third lens group, said fourth lens group and said fifth lens group move toward said object side, said lens groups move such that a spacing between said first lens group and said second lens group, a spacing between said second lens group and said third lens group, and a spacing between said fourth lens group and said fifth lens group become narrow while a spacing between said third lens group and said fourth lens group becomes wide, an aspherical surface is used in at least said first lens group, and said system satisfies the following conditions (1) and (5):

$$0.7 < |f_1/f_w| < 3 \tag{1}$$

$$2 < |f_5|/f_4 < 9 \tag{5}$$

where $f_1$ is a focal length of said first lens group, $f_w$ is a focal length of said zoom lens system at said wide-angle end, $f_4$ is a focal length of said fourth lens group, and $f_5$ is a focal length of said fifth lens group.

5. A wide-angle zoom lens system comprising, in order from an object side thereof:

a first lens group having negative refracting power;

a second lens group;

a third lens group having positive refracting power;

a fourth lens group having negative refracting power; and a fifth lens group, wherein to zoom from a wide-angle end of said lens system to a telephoto end of said lens system, said first lens group moves nonlinearly and said second lens group, said third lens group, said fourth lens group and said fifth lens group move toward said object side, said lens groups move such that a spacing between said first lens group and said second lens group, a spacing between said second lens group and said third lens group, and a spacing between said fourth lens group and said fifth lens group become narrow while a spacing between said third lens group and said fourth lens group becomes wide, an aspherical surface is used in at least said first lens group, and said system satisfies the following conditions (2) and (5):

$$0.3 < |f_3/f_4| < 1 \tag{2}$$

$$2 < |f_5|/f_4 < 9 \tag{5}$$

where $f_3$ is a focal length of said third lens group, $f_4$ is a focal length of said fourth lens group and $f_5$ is a focal length of said fourth lens group.

6. A wide-angle zoom lens system comprising, in order from an object side thereof:

a first lens group having negative refracting power:

a second lens group;

a third lens group having positive refracting power;

a fourth lens group having negative refracting power; and a fifth lens group, wherein to zoom from a wide-angle end of said lens system to a telephoto end of said lens system, said first lens group moves nonlinearly and said second lens group, said third lens group, said fourth lens group and said fifth lens group move toward said object side, said lens groups move such that a spacing between said first lens group and said second lens group, a spacing between said second lens group and said third lens group, and a spacing between said fourth lens group and said fifth lens group become narrow while a spacing between said third lens group and said fourth lens group becomes wide, an aspherical surface is used in at least said first lens group, and said system satisfies the following conditions (3) and (5):

$$0.3 < m_{345W}/m_{345T} < 6 \tag{3}$$

$$2 < |f_5|/f_4 < 9 \tag{5}$$

where $m_{345W}$ s a magnification of said third lens group to said fifth lens group at said wide-angle end, $m_{345T}$ is a magnification of said third lens group to said fifth lens group at said telephoto end, $f_5$ is a focal length of said fifth lens group, and $f_4$ is a focal length of said fourth lens group.

7. A wide-angle zoom lens system according to claim 1 or 4, which satisfies the following condition (2):

$$0.3<|f_3/f_4|<1 \qquad (2)$$

where $f_3$ is the focal length of said third lens group, and $f_4$ is the focal length of said fourth lens group.

8. A wide-angle zoom lens system according to claim 1, 2 or 4, which satisfies the following condition (3):

$$3<m_{345W}/m_{345T}<6 \qquad (3)$$

where $m_{345W}$ is the magnification of said third lens group to said fifth lens group at said wide-angle end, and $m_{345T}$ is the magnification of said third lens group to said fifth lens group at said telephoto end.

9. A wide-angle zoom lens system according to any one of claims 1, 2, 3, 4, 5 or 6, wherein said first lens group comprises a positive lens and a negative lens, and said second lens group comprises a doublet consisting of a positive lens and a negative lens.

10. A wide-angle zoom lens system according to any one of claims 1, 2, 3, 4, 5 or 6, wherein said third lens group comprises a doublet consisting of a set of a positive lens and a negative lens, and a single positive lens, said fourth lens group comprises a doublet consisting of a negative lens and a positive lens, and said fifth lens group comprises at least two positive lenses.

11. A camera device in which a zoom lens system as recited in any one of claims 1, 2, 3, 4, 5 or 6 is located as a phototaking optical system.

12. An electronic camera device in which a zoom lens system as recited in any one of claims 1, 2, 3, 4, 5 or 6 is disposed as a phototaking optical system, and an electronic image pickup element is located at a position where an object image formed by said phototaking optical system is received.

* * * * *